US009986716B1

(12) United States Patent
Betts-Lacroix

(10) Patent No.: US 9,986,716 B1
(45) Date of Patent: Jun. 5, 2018

(54) ANIMAL MONITORING DEVICE AND METHOD

(71) Applicant: Vium, Inc., San Mateo, CA (US)

(72) Inventor: Jonathan Betts-Lacroix, Belmont, CA (US)

(73) Assignee: Vium, Inc., San Mateo, CA (US)

( * ) Notice: Subject to any disclaimer, the term of this patent is extended or adjusted under 35 U.S.C. 154(b) by 111 days.

(21) Appl. No.: 15/169,575

(22) Filed: May 31, 2016

(51) Int. Cl.
| | | |
|---|---|---|
| *A01K 1/03* | (2006.01) | |
| *A01K 29/00* | (2006.01) | |
| *A01K 5/00* | (2006.01) | |
| *A01K 7/00* | (2006.01) | |
| *G06K 9/00* | (2006.01) | |
| *H04N 5/38* | (2006.01) | |

(52) U.S. Cl.
CPC ............. *A01K 1/031* (2013.01); *A01K 5/00* (2013.01); *A01K 7/00* (2013.01); *A01K 29/005* (2013.01); *G06K 9/00771* (2013.01); *H04N 5/38* (2013.01)

(58) Field of Classification Search
CPC .... A01K 1/031; A01K 1/0356; A01K 11/006; A01K 1/00; A01K 1/035
USPC ........ 119/419, 417, 416, 455, 418, 421, 482
See application file for complete search history.

(56) References Cited

U.S. PATENT DOCUMENTS

| | | | | |
|---|---|---|---|---|
| 6,257,171 B1* | 7/2001 | Rivard | .................... | A01K 1/031 119/419 |
| 7,126,471 B2* | 10/2006 | Ahmed | ................. | G01S 13/825 340/539.13 |
| 7,527,020 B2* | 5/2009 | Conger | ................... | A01K 1/031 119/417 |
| 7,661,392 B2* | 2/2010 | Conger | ................... | A01K 1/031 119/417 |
| 7,734,381 B2* | 6/2010 | Conger | ................ | A01K 1/0356 119/418 |
| 7,954,455 B2* | 6/2011 | Conger | ................ | A01K 1/0356 119/418 |
| 8,082,885 B2* | 12/2011 | Conger | ................... | A01K 1/031 119/416 |
| 8,156,899 B2* | 4/2012 | Conger | ................... | A01K 1/031 119/416 |
| 8,544,418 B2* | 10/2013 | Jiang | ........................ | A01K 1/01 119/161 |
| 2005/0241591 A1* | 11/2005 | Ingley, III | .............. | A01K 1/031 119/455 |
| 2009/0293815 A1* | 12/2009 | Coiro, Sr. | .............. | A01K 1/031 119/417 |

(Continued)

*Primary Examiner* — Yvonne R Abbott-Lewis
(74) *Attorney, Agent, or Firm* — Kim Rubin

(57) ABSTRACT

An animal monitoring device and method comprising an animal cage and associated electronics slab is described. The device is suitable for use in a modular vivarium implemented in one or two racks adjacent to walls in a holding pod. There is a one-to-one relationship between fixed slabs and removable cages. A single camera provides range of functions: its field of view includes the entire area of the cage accessible to an animal; it may observe water level in a water bottle; it may observe food level in a food tray; it may view activity on an exercise device; it may read the rear of cage card. The shape of the food tray is specialized to meet these requirements. An inner-cage frame holds elements in fixed locations within the cage. The cage is free of electronic penetrations. Supply and return air for the cage passes through the slab.

12 Claims, 7 Drawing Sheets

(56) References Cited

U.S. PATENT DOCUMENTS

2012/0085291 A1* 4/2012 Conger ................ A01K 1/0047
119/419

* cited by examiner

ANIMAL MONITORING DEVICE AND METHOD

BACKGROUND OF THE INVENTION

Vivariums house a number of animals, typically test animals, such as rats or mice, in a number of cages, often a large number. Prior art observation and recording of animal behavior is done manually. Some prior art observations has been automated by the use of cameras and other sensors.

Typically, animals are segregated into groups of cages where that group is part of an experiment.

Weakness of manual observation prior art is that it is not continuous and is not consistent. A weakness of automated observation is that it does not include all desirable parameters in a simple, cost-effective implementation.

Prior art automated video processing of animal activity in a cage is compromised by variable locations of equipment within the cage; inability to rapidly service equipment and husbandry supplies within the cage; inability to see an animal in the cage at all locations within the cage; inability to determine via a single video source water level and food level; and inconsistent cage configuration.

Prior art animal food trays suffer from easy spoilage or contamination and from poor serviceability.

SUMMARY OF THE INVENTION

Embodiments of this invention comprise a fixed "slab" and an associated, removable animal cage. Slabs and cages are arranged in a rack. Typically a rack is arranged as an array comprising a number of rows and a number of columns. Cages may slide in and out of the rack, supported by gravity, although many other methods of cage support and cage movement are possible.

Embodiments of cages when in a rack maintain a separate sterile, as defined herein, environment for each cage. Animals in a cage require husbandry elements including food, water, bedding, and fresh air that is temperature controlled and meets the sterility requirements of the experiment. In addition, lighting must be controlled. Exercise equipment or other environmental devices, such as nesting elements or supplies, may also be provided. It is critically important that a cage be uniquely identified without error.

A challenge in an automated vivarium is comprehensive, cost-effective cage and animal observation and monitoring.

Embodiments of this invention comprise a slab with a single camera wherein the view of that camera comprises (1) the entirety of the range in the cage accessible to the animal(s) in the cage; (2) a machine-readable cage ID; (3) water level; (4) food level. For this purpose, a specialized design and location of a food tray is used. For this purpose, a specialized design and location of a machine-readable cage ID card is used.

Some embodiments provide controlled visible and infrared (IR) lighting. Some embodiments comprise a single camera capable of vision in both visible and non-visible IR light. Some embodiments are free of any electrical penetrations into the cage. Some embodiments incorporate an animal scale that communicates in one or two directions, wirelessly, with electronics in the slab. Some embodiments comprise, in any combination, an audio generator; a microphone; user-operable buttons; user-visible visual indicators. By operator, we mean a human that interacts with the cage, slab, or rack. An operator may also comprise some or all automated interaction device, such as a robot to retrieve and place cages in the rack; communicate wirelessly or mechanically with the cage, slab or rack; use a camera to observe animals, cages, slabs, cage cards, or a rack.

A cage card is a removable, comprising a visual indicator comprising a unique cage ID, such as a number, name, barcode, image, and the like.

In some embodiments the slab comprises slab penetrations through which pass supply air to the cage, return air from the cage, or both. In some embodiments the interior of the slab is isolated, with respect to sterility of the air, from either the supply air or the return air, or both.

In some embodiments, sensors in the slab measure one or more parameters of the supply air, return air, or both, using sterile, sealed penetrations from the slab through the supply air or return air slab penetrations. Such parameters may include, in any combination: temperature, humidity, concentrations of chemicals such as ammonia, or concentration of biological elements. The term concentration may mean only presence or absence, or may mean an analog or digital numeric metric over a range.

In some embodiments cages may be removed and replaced in the rack with no required mechanical, pneumatic, or electrical connections, disconnections, or operations, other than pushing, pulling, lifting or lowering of the cage. In some embodiments only pulling or pushing the cage is required for cage removal and placement in the rack, respectively.

In some embodiments the slab is supported only from a hollow conduit through which passes in any combination: supply air to the cage; return air from the cage, and electronic cabling to the slab electronics. The hollow conduit may have one, two, three, or more interior channels, such as for supply air, return air, and cabling. In some embodiments the slab comprises all of the electronics used for automated observation of the cage, animals in the cage, and cage card.

A core novelty of the invention is the arrangement of elements described herein to accomplish comprehensive, cost-effective monitoring and observation as described herein.

In some embodiments the cage is supported only by its associated slab.

We note that configurations as described in embodiments are not esthetic or design choices, nor are simple combinations of prior art, but rather are critical to the effective implementation and use of embodiments to provide unexpected and previously unavailable features and benefits. Simpler and more comprehensive implementation of automated monitoring and observation functions than the prior art provides improved reliability, lower capital and operating cost, and higher quality data.

DETAILED DESCRIPTION

All elements of all Figures are generally schematic and show one embodiment only. Some elements are proportionally shown. Some shown elements are not described elsewhere.

All descriptions for Figures below are sample embodiments and scenarios. Some described elements are optional or have alternative embodiments.

Figure 1:
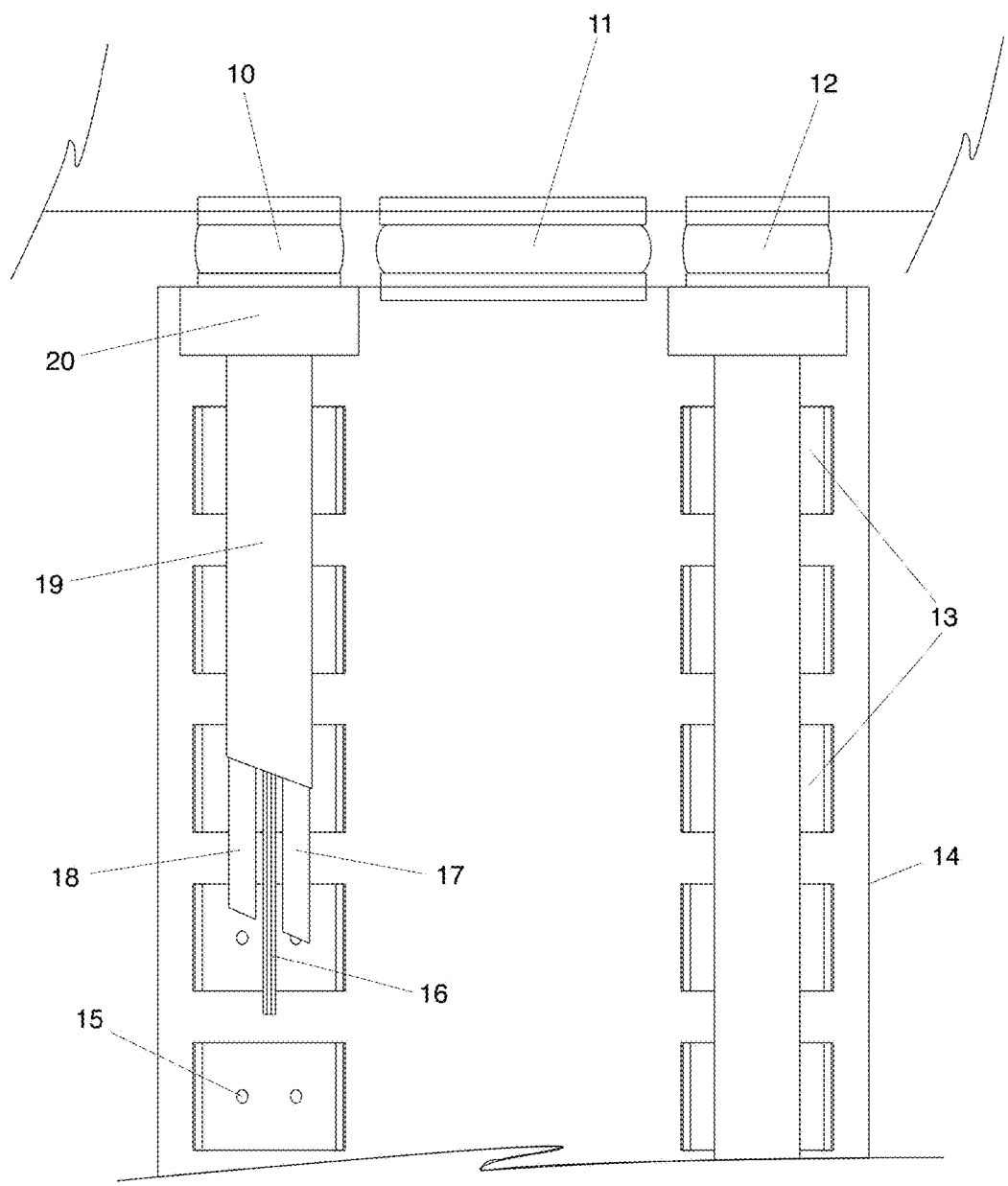
FIG. 1 shows an overhead view of a portion of a holding pod with passthroughs.

FIG. 1 shows an overhead view of one end of a holding pod, 14, and its disconnectable passthrough connections, 10, 11, 12 to a hallway pod (not shown). It shows a doorway passthrough with an inflatable gasket, 11, and two sterile air passthroughs, 10, one for a first cage rack near one wall of the holding pod and a second, 12, for a second cage rack near the other wall of the holding pod. Also shown are two pairs of vertical distribution plenums, 20. Also shown is a portion of a horizontal distribution duct bar, 19, with three channels partially exposed, 18, 17, and 16. The other shown horizontal distribution duct bar does not show the cutaway inner channels. Also shown are schematic mounting holes for the slabs under the horizontal distribution ducts, 15. Such mounting holes are purely schematic; many alternative mounting or securing arrangements are possible, not restricted to screws, snaps, hook-and-loop fasteners, adhesives, tape, press-fit fasteners, melting, braising, welding, magnetics, hooks and the like. Designator 13 shows two out of ten visible slabs. Note that because this is a top view that two additional air passthroughs are hidden from view. Also hidden from view are the other horizontal distribution ducts and additional slabs and animal cages. The central portion of the holding pod provides access to the animal cages; and access to animal cages with automated equipment, such as a cage placement, removal, delivery (to the doorway), monitoring, and related fully or partially automated. Such a robot is not shown. Note that the vertical distribution plenums have a supply portion and a return portion, where a division between these portions is not shown.

Figure 2:
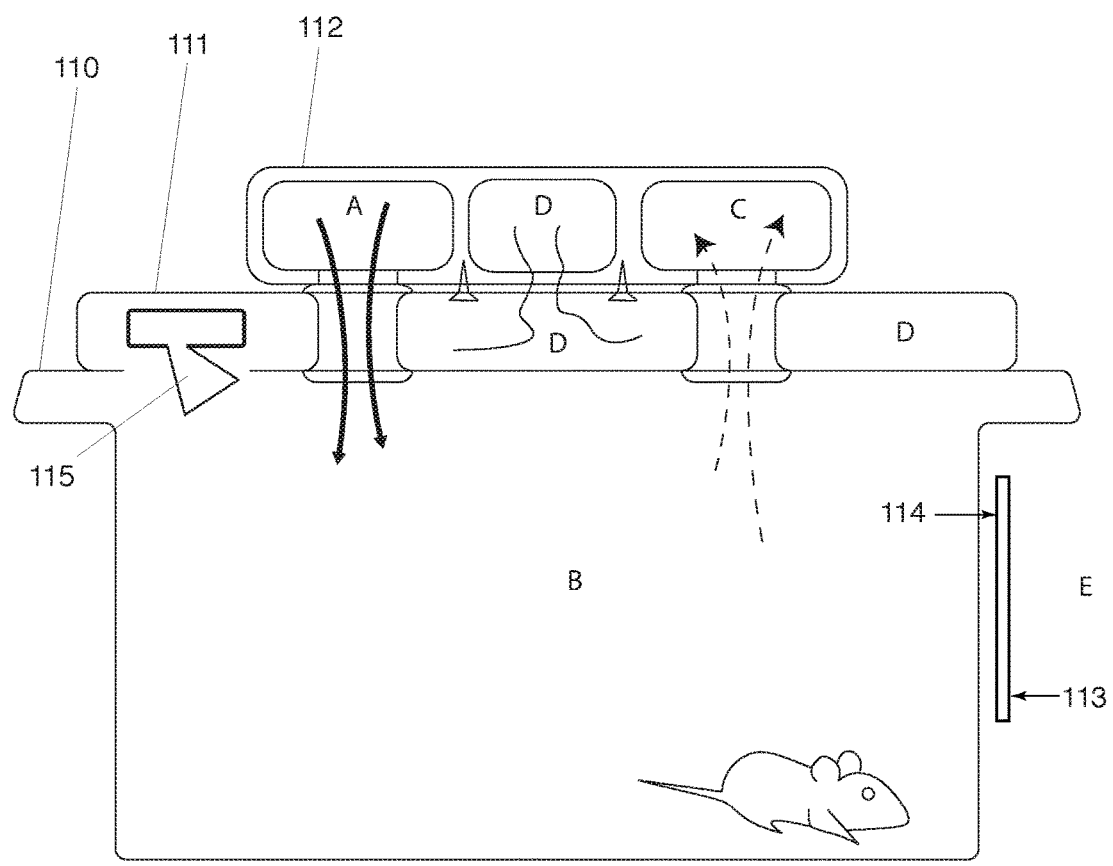
FIG. 2 shows a schematic side cross-section view of a cage, slab and horizontal duct bar.

FIG. 2 shows an end view of a slice through a horizontal duct bar, 112, with three channels, A, D, and C, and a slab, 111, and one animal cage, 110. This Figure shown five distinct volumes of air, from the viewpoint of sterility and isolation. A is supply air, which maintains sterility from an HVAC module or optionally an HEPA filter, through a plenum in a hallway pod, into the holding pod, and into the channel A. This sterile supply air passes through an optional passthrough the slab without an opening into the interior of the slab, except for optional sensors. The supply air enters the cage to form cage air B. Cage air B exits as return air, C, which similarly may passthrough the slab, sealed except for optional sensors, and then into a return air plenum in the hallway pod. Air D is in the interior of the slab. This interior comprises electronics. Cabling may enter or exit the interior of the slap through a channel, shown. The interior air on the pods is shown as E. This air is predominantly isolated from supply air A and return air B, although there may be small leaks, including when cages are inserted or removed. Air D is optionally open to air E at one or more cable ends of channel D. Not shown is air F, which is outside the vivarium.

Generally, air A has the highest pressure. It may be intentionally partially vented into air E to provide fresh air for the occupants of the interior of the vivarium. Air C operates at the lowest pressure so that any leaks to any other air leak into air C, not out of air C, Air D operates at the same or close to same pressure as air E. Cage air B may operate higher, lower or equal to air E. Air E operates at higher pressure than air F so that any leaks in the vivarium to the outside vent air from E to F, maintaining the sterility of vivarium.

In some embodiments the above air pressures are maintained entirely by the HVAC module and non-electrical and non-hydraulic openings within the vivarium between any of the A through F air volumes. Supply air may have intentional flow into volume E to supply fresh air for occupants in the vivarium. In some applications the pressure in E is less than F to protect the environment from possible contamination from the vivarium. Volumes E and F are isolated by the walls of the vivarium, not shown.

Supply air is shown a solid black airflow arrows and return air is shown as dotted airflow lines.

Note the cage is removable, such as sliding, from the pod. The passthroughs may or may not seal automatically, such as by the use of nipples, when a cage is removed. Note that the supply from and return airflow to the horizontal duct bar 112 passes through the slab 111, without an air connection to the interior of the slab. Sensors inside the slab may monitor such airflow through air seals. Sensors may include temperature, humidity, and chemicals, such as ammonia.

Figure 3:
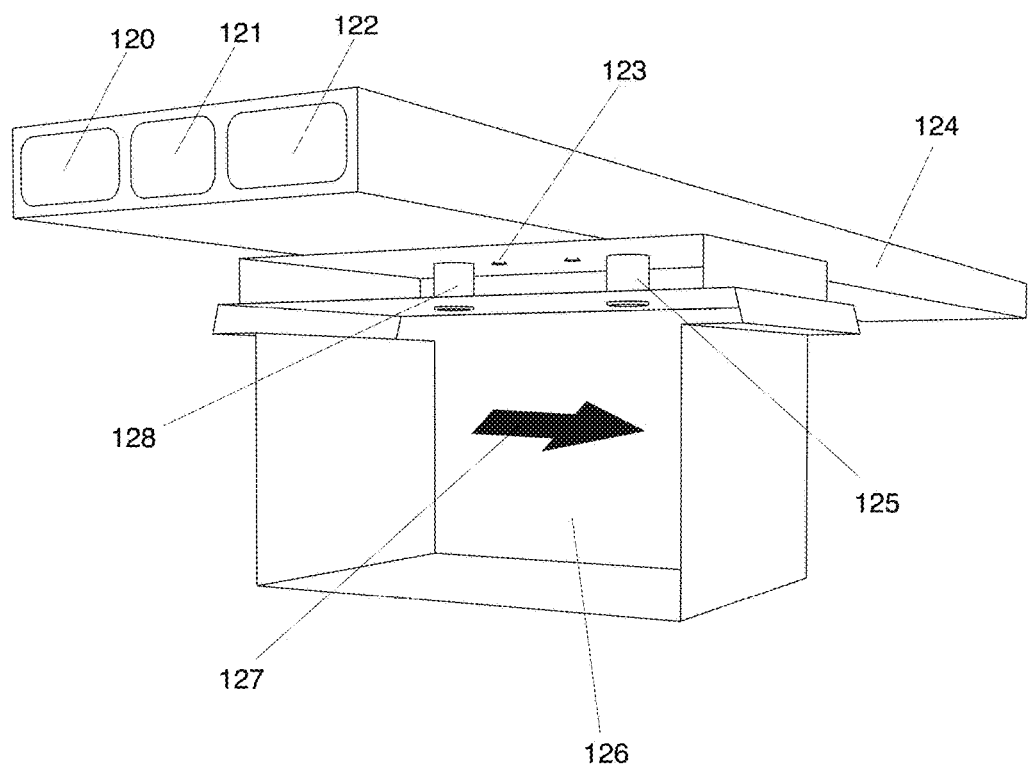
FIG. 3 shows a perspective view of a cage, slab and horizontal duct bar.

FIG. 3 shows a detail of a cross-section of a horizontal duct bar, 124, a slab and a cage, 126. Three channels of the horizontal duct bar, 120, 121, and 122 are shown; supply and return air passthroughs through the slab to the cage are visible, 128 and 125. Arrow 127 shows the motion of the removable cage from the fixed slab. 123 shows schematic mounting holes to mount the slab to the horizontal duct bar.

Figure 4:
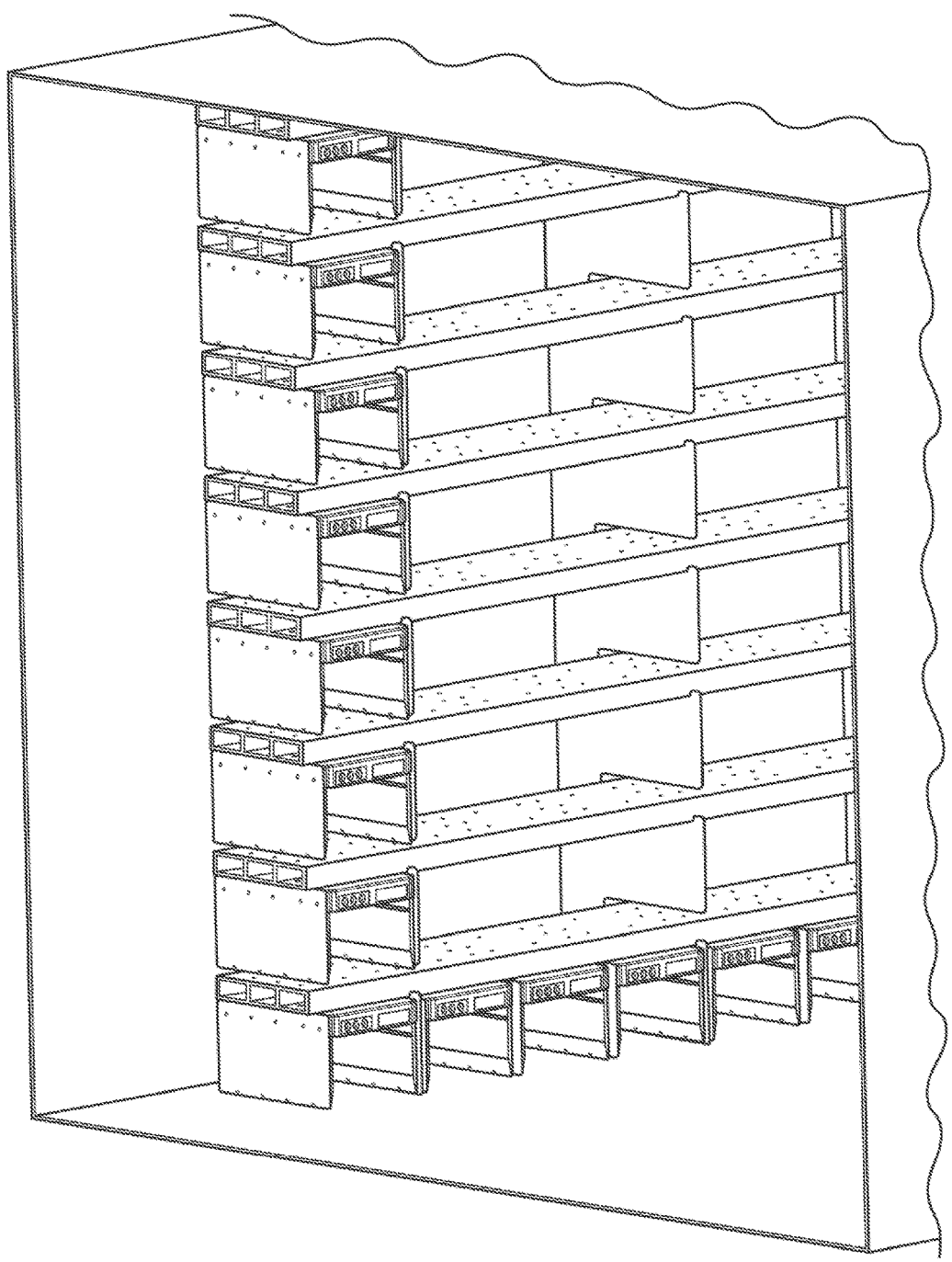
FIG. 4 shows a perspective view of a column and row of rack cage locations.

FIG. 4 shows a perspective view in a holding pod showing a portion of cage rack. Cages are not shown. FIG. 4 shows one column for 8 rows, and a portion of the bottom row. Some slabs are visible. Each slab has three illuminated buttons. Illumination may be controlled by electronics in the slab or remotely. Buttons are for an operator or robot. An area for a label, to the right of the illuminated buttons, is shown. Such a label may have human readable or machine-readable data. Such data may include an ID for the slab or slab location. Schematic mounting holes in the horizontal duct bars for slabs are shown. One mounting system is to use passthrough screws, through the horizontal duct bar into the slabs. The holes are sealed on each side by a gasket or by the nature of the screw or receiving material, such as nylon. One vertical support panel is shown, with slots to support horizontal duct bars. A cut-away view of eight horizontal duct bars is visible, showing three internal channels. Horizontal duct bars may be PVC, may be monolithic, and may be extruded. Vertical support panels may be metal, such as steel or aluminum sheet metal, or may be plastic. Note the simplicity of rack construction over prior art. Note the simplicity and reliability of airflow components over prior art. Note the simplicity and reliability of wiring over prior art. Note the convenience, automation, reliability and consistency of operator (or robot) interface over prior art.

A key novelty for some embodiments is the connectable and disconnectable ability of the passthroughs. Fresh, sterile pods may be brought to a modular vivarium with existing sterile pods and connected without loosing the sterility of either adjoining pod. Similarly, in some embodiments a pod may be removed without loosing the sterility of at least one of the connecting pods. One embodiment uses an inflatable gasket, and may also use a removable sheet or cover over one or both ends of the passthrough. Embodiments provide a means, such as closable vent to sterilize the volume within the gasket and between the two pods.

Figure 5:
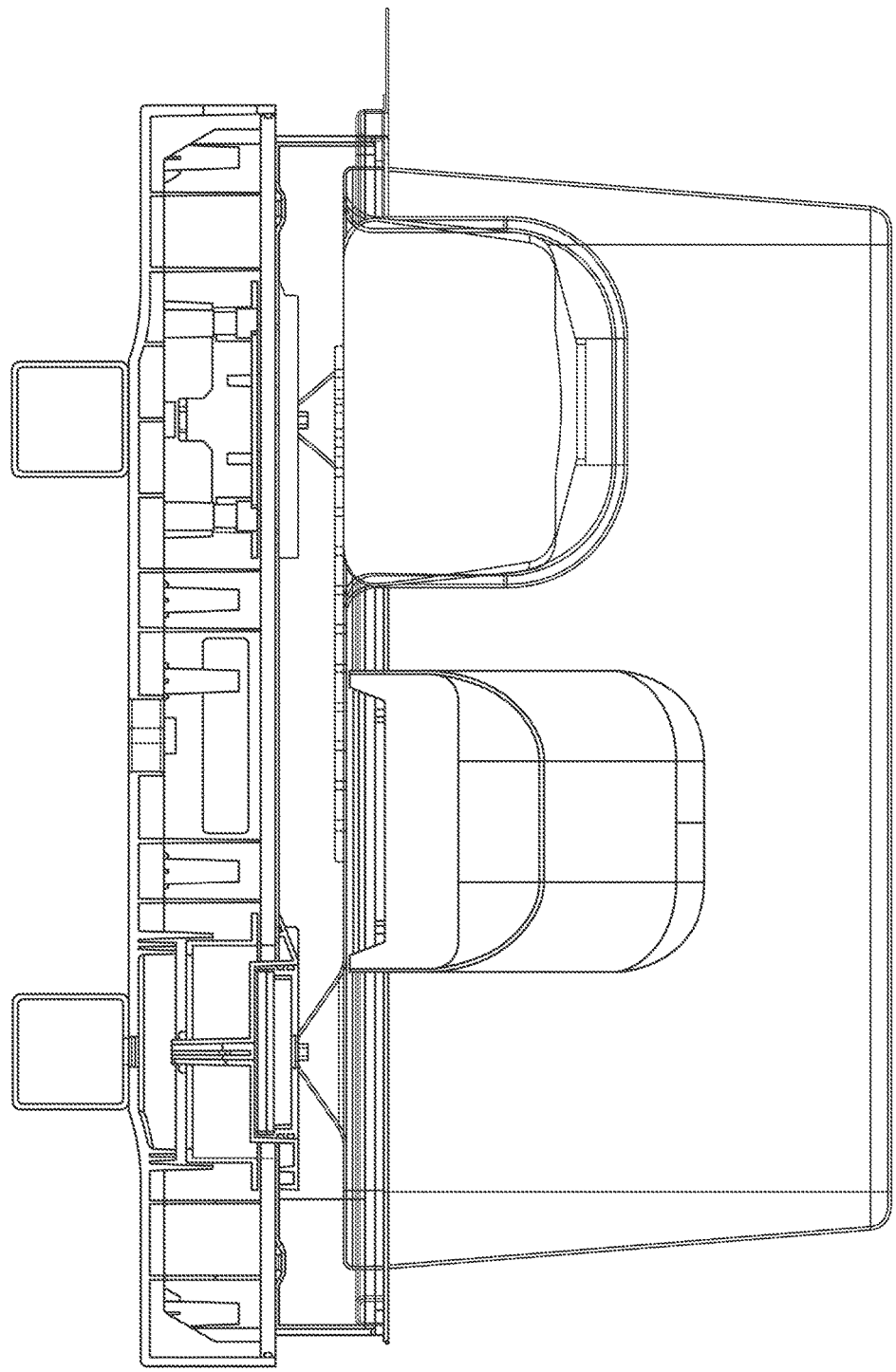
FIG. 5 shows a side view cutaway of a slab, cage and air ducts.

FIG. 5 shows a slice of a side view of a slab with a removable cage installed, and schematic supply and return air ducts. The slab is the largest horizontal rectangle, near the top of the drawing, with numerous internal elements shown. The supply air return air ducts are shown as square cross-sections above the slab. In this Figure, the air ducts are not shown as part of a monolithic horizontal duct bar. The cage is the inverted frustum shape in the lower half of the drawing. The drawing shows the upper lip of the cage and the shelf on which this lip rests. Also shown is a specialized food tray, as the large structure inside the cage, on the left. Note that a tapered side of the food tray is visible, such that the entire bottom of the cage is visible to a single camera in the slab, not shown. A water bottle is shown in the cage on the right side. Visible inside the slab is a first air passthrough below the air supply duct. Below this passthrough is a pyramid shaped air nipple. Visible inside the slab is a second air passthrough below the air return duct. Below this passthrough is a second pyramid shaped air nipple. Various sensors are shown inside both passthroughs in the slab.

Figure 6:
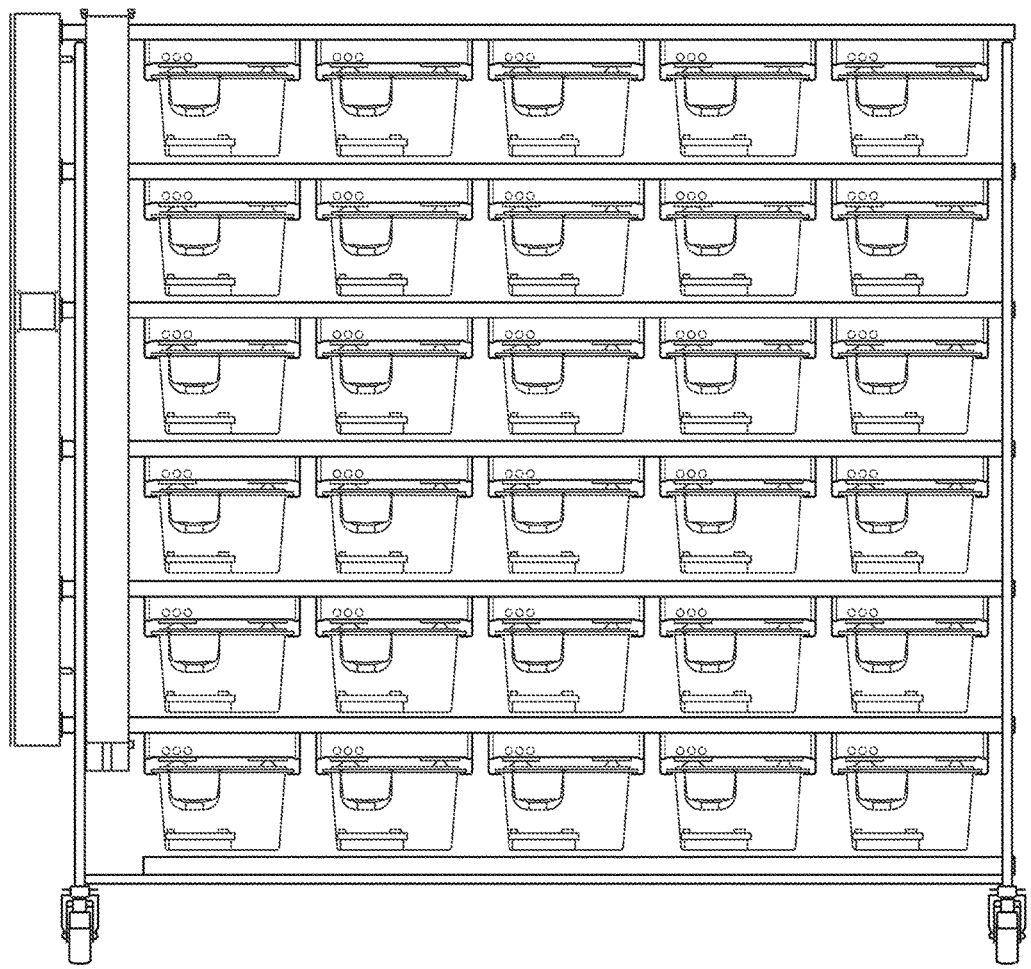
FIG. 6 shows a view of a rack with cages.

FIG. 6 shows a schematic view of a rack. The rack shown has different elements that some claimed embodiments. Here six rows and five columns of slabs and cages are shown. Claimed racks may have 20 to 60 columns of cages, and six to nine rows of cages. The rack shown as wheels. Some rack embodiments are supported by vertical panels (not shown), not wheels. Horizontal duct bars are shown. Slabs above cages are shown. Three illuminated buttons are shown on each slab. Cages show a specialized feed tray and a wireless scale in each cage. Not shown is any exercise equipment in cages. A vertical air plenum is shown on the left. This plenum is different than a vertical plenum in some embodiments. In the shown in this Figure, slabs are supported only by the horizontal duct bars and cages are supported only by slabs.

Figure 7:
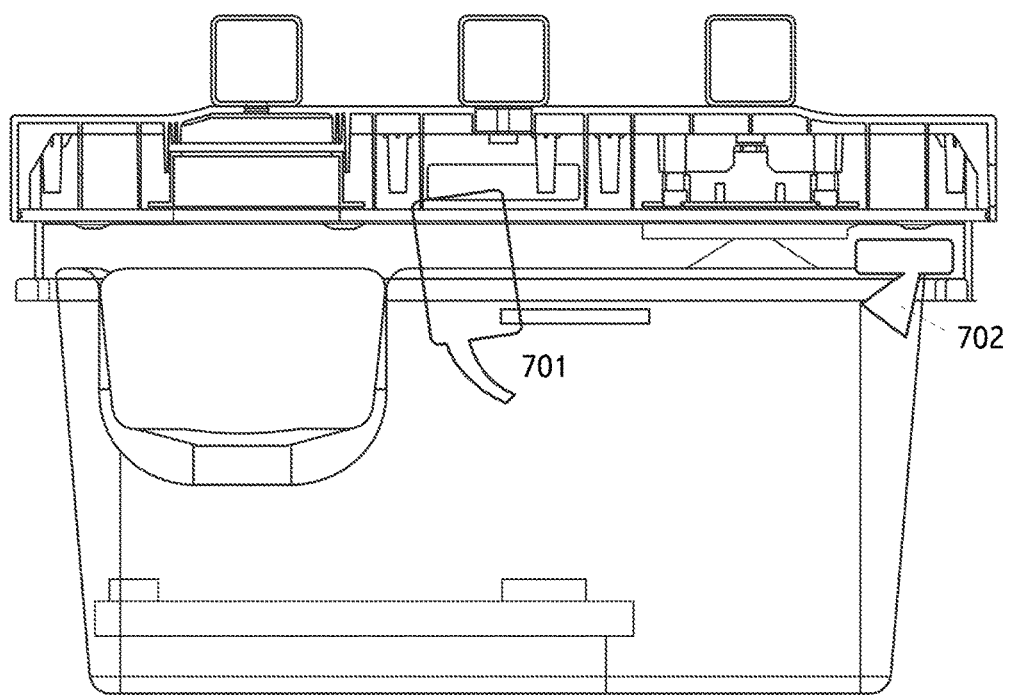
FIG. 7 shows another side view cutaway of a slab, cage and ducts

FIG. 7 shows a slice of a side view of a slab with a removable cage installed, and schematic supply and return air ducts, and schematic cable duct. The slab is the largest horizontal rectangle, near the top of the drawing, with numerous structural elements shown. The supply air return air ducts are shown as black square cross-sections above the slab. In this Figure, the air ducts are not shown as part of a monolithic horizontal duct bar. A second set of three ducts is shown at the bottom of the drawings. These ducts service the row of cages below the shown slab and cage. The cage is the inverted frustum shape near the center of the drawing. The drawing shows the upper lip of the cage and the shelf on which this lip rests. Also shown is a specialized food tray, as the large structure inside the cage, on the left. Note that a tapered side of the food tray is visible, such that the entire bottom of the cage is visible to a single camera in the slab, not shown. Visible inside the slab is an air passthrough below the air return duct. Below this passthrough is a pyramid shaped air nipple. A wireless scale is shown inside the cage, at the bottom.

Embodiments include a specialized food tray. Embodiments of the food tray have combinations of the following characteristics:
- tapered as an inverted frustum so that the entire bottom of the cage is visible to a single camera at the top of the cage;
- transparent so that a food level is visible to a camera;
- self-supporting when removed from the cage;
- located within the cage above the bottom of the cage so as to avoid contamination;
- held in a fixed cage location by a removable inner-cage frame.

Cages may comprise a wireless scale or an exercise device. Such elements may be restricted to a fixed cage location by a removable inner-cage frame.

A key limitation in some embodiments is the use of only a single camera per cage or per slab for all of the purposes and method steps described in the specification, drawings or claims. That is, embodiment are free of any more than one imaging device.

The following volumes for air may be defined generally as:
- Volume A—Clean supply air.
- Volume B—Cage air.
- Volume C—Dirty return air.
- Volume D—Air around electronics and cabling
- Volume E—Air inside the vivarium.
- Volume F—Outside, atmospheric air.

Ideally, the following relationships hold between these above air volumes.

Volume A clean air originates as the output of HEPA filters, which in turn are supplied by treated air from HVACPIT pods. In one embodiment, this air passes through hallway ceiling plenums, through gasketed sealed openings into vertical plenums in the holding pods, then through horizontal duct bars, then into cages via air supply nipples. Note that as this clean air passes from the horizontal duct bars through the slabs that this path is sealed from the rest of the slab interior, that is, volume D. Ideally, due to positive pressure with respect to all other volumes (B-F) and seals, there is no contamination of volume A air from any other source until this clear air enters the cage.

Volume B air within circulates within each separate cage. Air in one cage does not mix with any other air, so long as the cage is in the rack. When the cage is removed from the rack the top of the cage is open, so that air in volume B mixes quickly with volume E air. When a cage is removed the nipple at the now A/E interface has limited flow and a pressure differential so that volume A air is not back contaminated by volume E air. When a cage is removed the nipple at the now E/C interfaces has limited flow and a pressure differential so that volume C air is not back mixed into volume E air. In some embodiments the A/B and the B/C nipple may close partially or fully when the cage is removed from the rack.

Volume C air is dirty, return air from the cages. This air path is from the cage interiors, volume B, through the B/C nipple, into the C channel of the horizontal duct bars. Note that as this dirty air passes into the horizontal duct bars through the slabs that this path is sealed from the rest of the slab interior, that is, volume D.

The interior space of the slab, volume D, includes air around processors, LEDs, cameras, optics, optical and radio communication links, audio input and output, sensors and other electronics and wiring within the slab. This volume is connected through an opening into the central, or wiring channel of the horizontal duct bars. This volume D air is isolated from volume A, B, and C air. Note that the slab may have sensors in both the supply air volume A and the return air volume C. The sensors or electrical connections to these sensors use sealed penetrations into nipples from A to B or from B to C, or sealed penetrations directly into the horizontal duct channels A or C, or into cage interior B. Thus, such sensors do not alter the air isolations as described. Visual sensors and lights may pass through from the slab interior D into the cage interior B in either direction without altering the air isolations as described. All or a portion of the slab or cage may be transparent or translucent for these purposes. In addition, sensors, lights, audio, buttons and other elements within the slab may interface to the interior of the vivarium, volume E, while maintaining air isolation between volumes D and E. In some embodiments the slap interior D is open to the vivarium air, volume E, such that air in volumes D and E intermix.

Volume E comprises the interior air of the vivarium. Vivarium staff and some equipment operate within this air. Some supply air from Volume A may leak or purposefully be provided in to volume E. Some volume E air may lead or be purposefully vented out in to volume C. Volume E air should not mix with atmospheric air, volume F. However, any leaks, as well as ingress and egress cause volume E air to exit into the atmosphere, volume F, due to positive pressure of volume E with respect to volume F. Volume E air exits through Typically the volume D channels of the horizontal duct bars are open at the end of the cage racks for wiring. This is the interface point between volume D and volume E air. Such D and E air may freely intermix. In some embodiments, a small flow of volume A air may be provided into the slab interiors to provide a slow airflow through the volume D volumes to remove any gases from electronics, cabling, and leaks from other sources through the horizontal duct bars into volume E.

Controlled flow from volume A into volume E may provide fresh air for personnel and to maintain volume E at positive pressure with respect to volume F, normal, outside, atmospheric air.

In one embodiment horizontal ducts A, D and C may, in any combination provide some or all of the support, directly or indirectly to animal cages. That is, such ducts, in any combination, may be a structural component of cage racks. Such ducts, in any combination, may be partial or the complete mechanical support for "slabs," that is, electronics enclosures, which in turn provide partial or complete mechanical support for cages. In one embodiment, the only mechanical support for slabs such horizontal ducts. Slabs may be secured to the bottom of the ducts. Such support may be called, "hanging." Support connection may be via screws, rivets, nails, single or multi-part adhesive, hooks, loops, hook and loop fasteners, buttons, snaps, ties, string, cord, rope or cable, permanent or electric magnet, static or electrostatic connection, slides, friction elements, press fit, soldered, braised, welded or melted, 3-D printing, or other fasteners, singly or in any combination. Support may be permanent or removable. Support may alternatively be under, from the side, or from the back of the slabs, in any combination. In one embodiment, the only mechanical support for a cage may be an associated slab. h support may be called, "hanging." Support may be via any connection method listed above, or another method. Support may alternatively be under, from the side, or from the back of the cages, in any combination. Ideally, cages slide in and out via passive slides, held in place by friction, gravity, detents, magnets or other simple and passive mechanism. However, arbitrarily more complex methods and mechanisms may be used to secure cages within a cage rack location.

In one embodiment duct channels for volumes A, C and D, as described above, may be combined, in any combination into a monolithic duct bar. In one embodiment all three volumes are combined into a single duct bar. In one embodiment, the duct bar is extruded PVC. Exemplary cross sectional dimensions for the ducts are 2"×4" for ducts A and C; and 2"×3" for duct D. Such dimensions may vary by plus or minus, in any dimension, by ⅛", ¼", 1/1", 1", 1.5", 2", 2.5", 3", 4", 5" or 6", in any combination. All such combinations are explicitly claimed.

A duct bar refers to any unit, module or length of ducting, which may comprise one or more interior channels. In one embodiment, duct bars used as structural elements for animal racks may be in any length from 1 foot to 60 feet.

In one embodiment of cage racks, the rack comprise one or more "rack stands." A rack stand may be secured permanently or temporarily to the inside floor of a holding pod, using any of the above connection methods. A rack stand may simply rest on the floor, or may be on slides or wheels. A rack stand may be secured permanently or temporarily to the inside wall of a holding pod, using any of the above connection methods. A rack stand may not be attached to the wall at all, or may touch, lean or rest against the wall. A rack stand comprises one or more holes through duct bars are placed. The rack stand(s) supports the weight of the duct bar(s) and any elements the duct bar in turn is supporting. A rack stand may be primarily in the form of sheet. In one embodiment, there is one rack stand between each column of cage locations. In one embodiment there is one hole in each rack stand for horizontal duct bar. In one embodiment there is one horizontal duct bar for each row or cage locations.

For example, for a cage rack consisting of seven rows and 40 columns of cage locations, 39-41 rack stands may be used, each rack stand comprising seven holes, each hole being penetrated by and supporting one duct bar. A total of seven duct bars are used, each duct bar supporting up to 40 slabs and cages. Some embodiments use fewer rack stands.

An exemplary holding pod might comprise two such exemplary cage racks, one along each long wall.

Suitable numbers of rows are 4 to 40. Suitable numbers of columns are 4 to 300. However, typically the number of rows and columns in maximized subject to the size of the cages and the size of the available space for a cage rack.

Exemplary cages include commercially available mouse and rat cages.

Alternative names for food tray are food dispenser and food hopper. Observing, seeing with a vision system, or detecting a food level may be as simple as detecting if any food is remaining or not. It is also valuable to have a more resolution measurement indicating how much food is remaining.

Various embodiments for observing a level of water in a water bottle include: observing the meniscus of the water at the edges of the water bottle; observing the location of specular reflections from the water in the bottle; observing the location of one or more floating objects on top of the water, such as black floating balls; observing the location of a specular reflection from a known, fixed source.

Definitions

"Dynamic" means may be performed without interrupting the operation of an operating vivarium in the cluster.

"HVAC" means "heating, ventilation and air-conditioning."

"IT" means "information technology."

"Shipping container" means an ISO Standard intermodal shipping container, including but not limited to IS 668:2013 Series 1 and ISO 1496-1:2013 specifications, an later ISO specification that supplement or supplant these. Sizes included the scope of "shipping container" include 20' container, 40' container, 40' high-cube container, 45' high cube container, 48' container, 53' container and 60' container. Also included are nearest metric standard containers to the prior list. Also included are standard military containers, some of which comply with ISO 668 1D, 1E, and 1F Standards. A preferred embodiment uses 40' hi-cube and 53' containers, in any combination.

"Sterile interior air"—Means pathogen-free interior air, in the context and meaning in the operation and art of operating vivariums.

"Pathogen-free"—means the population of microbes, including but not limited to bacteria, viruses, prions and toxins, relevant to an experiment, test or study ("study"), is sufficiently reduced to meet the needs of the study, or to impact or alter study results, or to alter the credibility or repeatability of study results, for studies using the vivarium, and to not impact the health, performance or behavior of the target animal population in the vivarium or of the workers.

"Subset"—May include any non-zero number of elements from a set, including all elements from the set.

"SWITCH"—The normal IT definition of "switch," e.g., layer 2 IP frame forwarding. A switch may provide additional functions, including routing, security, redundancy, and other such functions available to IT industry "switch" components.

"T-formation" means nominally at right angles, although other angles might be used, such as mimic an italic "T."

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims.

I claim:

1. A device for monitoring animal behavior comprising:
a sterile animal cage, free of electrical penetrations;
a human readable cage card comprising human-readable cage identification on a first side facing away from the cage and machine-readable cage identification on a second side facing into the cage;
an animal water bottle in the cage;
an animal food tray in the cage;
a single camera adapted such that the camera view comprises: the entire animal-accessible area in the cage, a water level in the water bottle, a food level in the food tray; and the second side of the cage card;
wherein the animal food tray is located above the floor of the cage; and
wherein the shape of the animal food tray is such that the animal food tray does not obscure the camera view of any part of the animal-accessible area of the cage.

2. The device of claim 1 further comprising:
an animal exercise device;
a frame inside the cage wherein the frame restricts the location of the food tray and the location of the animal exercise device to fixed locations within the cage.

3. The device of claim 2 further comprising:
a wireless animal scale;
wherein the frame restricts the location of the wireless scale to a fixed location within the cage.

4. The device of claim 2 wherein:
the frame is removable from the cage without the use of tools.

5. The device of claim 1 wherein:
the food tray is removable and wherein when the food tray is removed from the cage it is self-supporting.

6. The device of claim 1 further comprising:
a monolithic three-channel duct comprising three channels;
wherein a first channel is adapted to carry sterile air to the animal cage;
wherein a second channel is adapted to carry electronic cables to the camera; and
wherein a third channel is adapted to carry return air from the animal cage.

7. The device of claim 6 further comprising:
a fixed slab wherein the slab comprises the camera;
wherein the slab is solely supported by the monolithic three-channel duct;
wherein the animal cage comprising the water bottle, food tray, and cage card is removable from the slab; and
wherein the removable animal cage is supported solely by the slab.

8. The device of claim 7 wherein:
the fixed slab is adapted to pass sterile supply air through the slab into the removable cage; and
wherein the fixed slab is adapted to pass return air from the removable animal cage through the slab.

9. The device of claim 1 further comprising:
a fixed slab wherein the slab comprises the camera;
wherein the animal cage comprising the water bottle, food tray, and cage card is removable from the slab.

10. The device of claim 1 further wherein:
the device is free of any more imaging devices than the single camera.

11. The A method of monitoring animal behavior comprising the steps of:
transmitting video from the camera of the device in claim 1;
recording the transmitted video.

12. A method of monitoring animal behavior comprising the steps of:
transmitting video from the camera of the device in claim 6 through the electronic cable in the second duct channel;
supplying sterile air from the first duct channel to the animal cage;

passing return air from the animal cage through the third duct channel.

* * * * *